3,341,583
SYNTHESIS OF SYMMETRICAL UREAS
John E. Anderson, Clyde E. Parish, and George H. Ross, Houston, Tex., assignors to Signal Oil and Gas Company, Los Angeles, Calif.
No Drawing. Filed May 4, 1964, Ser. No. 364,754
13 Claims. (Cl. 260—553)

The present invention generally relates to organic compounds and methods of making the same, and more particularly relates to improved methods of preparation of ureas, that is, urea and substituted ureas.

Urea and substituted ureas are important intermediates in the preparation of various chemical products useful in agricultural chemistry, such as in soil treatment, fungicides, insecticides, germicides and the like, and in the preparation of other types of chemical products. Urea can be prepared by reaction between ammonia and carbon dioxide. Substituted ureas are usually prepared by reactions involving the use of phosgene with primary and secondary amines.

Phosgene is the diacid chloride of carbonic acid and has the formula $COCl_2$. It is a colorless very volatile liquid which is extremely poisonous and has been used in wartime as a lethal military gas. It has a specific gravity of 1.392, a melting point of $-104°$ C., a boiling point of $8.2°$ C., is slightly soluble in water and is slowly hydrolyzed by it, and is also soluble in benzene and toluene. It has a specific volume of 3.9 cu. ft./lb. Phosgene is usually manufactured by passing a mixture of carbon monoxide and chlorine over activated carbon, but is relatively expensive, in contrast to other more readily available and less toxic agents for various chemical reactions.

Phosgene enters into typical reactions of hydrolysis to carbonic acid and ammonolysis to urea, for example, $COCl_2 + 2NH_3 \rightarrow CONH_2NH_2 + HCl$. The same general type of condensation reaction is involved when phosgene is caused to react with an amine. For example, phosgene reacts with aniline to form s-diphenyl urea or carbanilide, which has a melting point of about 239° C.

It would be desirable to provide a less expensive method of preparing substituted ureas than the described typical reactions employing phosgene, and which method would also be suitable for the preparation of urea.

Accordingly, the principal object of the present invention is to provide new methods of preparation of urea and substituted ureas.

It is a further object of the present invention to provide urea and substituted ureas in high yield at low cost.

It is a further object of the present invention to provide urea and substituted ureas in an improved manner utilizing inexpensive, readily available materials.

The foregoing and other objects are accomplished in accordance with the present invention by providing an improved economical method of preparation of urea and di-substituted ureas and tetra-substituted ureas, which method utilizes carbonyl sulfide.

Carbonyl sulfide has the formula COS. It is normally a gas, having a boiling point of $-36.7°$ C. at normal pressure, and is somewhat toxic, but considerably less so than phosgene. Carbonyl sulfide is usually present as a sulfur-bearing contaminant in various types of refinery gases, such as propylene, and can be removed intact therefrom by a method such as more particularly described in copending U.S. patent application, Ser. No. 329,947, filed December 12, 1963, entitled "Hydrocarbon Purification," of which George E. Hamm is the inventor, said application having been assigned to the assignee of the present invention. Carbonyl sulfide has the advantage of being relatively inexpensive and can be synthesized from readily available materials, such as sulfur and carbon monoxide, which are by-products of certain conventional oil refining processes.

In accordance with the present invention, an adduct which has been formed by contacting carbonyl sulfide with selected amine or ammonia in a suitable solvent is oxidized under selected conditions to provide the desired urea or substituted urea. As a specific example, about 90 gm. of dimethyl amine are dissolved in 300 ml. of benzene, and the resulting solution is contacted at 30° C. over a 15 minute period with carbonyl sulfide gas, the gas being bubbled through the solution until about 60 gm. of carbonyl sulfide have been absorbed by the dimethyl amine-benzene solution. The solution is then oxidized at 50–60 p.s.i.g. oxygen pressure in a stirred autoclave at 30° C. for three hours and is then fractionally distilled to recover about a 65% yield of tetra-methyl urea having the structural formula

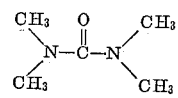

Further objects and advantages of the present invention will be apparent from a study of the following detailed description.

Now referring more particularly to the present method, and adduct containing and consisting essentially only of a nitrogen compound selected from the group consisting of ammonia, primary amine and secondary amine, and carbonyl sulfide is converted in a novel manner to the desired end product. The adduct may be formed by a reaction between a selected nitrogen compound selected from primary amine, secondary amine or ammonia and carbonyl sulfide under preferably essentially anhydrous conditions. The reagents for the adduct-forming reaction are preferably essentially anhydrous and it will be understood that when such reagents and such reaction are referred to hereinafter they are essentially anhydrous. The amine may be any suitable primary or secondary amine. Ammonia may also be used. The selected amine or ammonia is generally characterized by the structural formula

where R and R' are each either H or a suitable radical such as an alkyl or cycloalkyl radical. Certain aromatic amines such as aniline have also been found to be useful.

Typical primary amines which can be used in the present method are the following: aniline, toluidine, xylidine, naphthyl amine, ethylamine, methylamine, propylamine, isopropylamine, butylamine, cyclohexylamine and methylcyclohexylamine. Further examples of suitable primary amines are the following: primary alkylamines possessing from 4–20 carbon atoms, benzylamine and various alkyl substituted benzylamines.

Suitable secondary amines include the following: diethyl amine, methyl ethyl amine, dimethyl amine, dipropylamine, methyl propylamine, ethyl propylamine, ethyl cyclohexyl amine, diisopropyl amine, methyl cyclohexyl amine, and propyl cyclohexyl amine. Further examples of suitable secondary amines are the following: piperidine, pyrrolidine, azetidine, ethlyene imine and various dialkylamines possessing alkyl groups of usually less than 12 carbon atoms.

It will be noted that with regard to the above-described primary and secondary amines, steric or other reaction-blocking effects tend to increase with molecular weight so that it becomes increasingly difficult to complete the adduct-forming reaction as the molecular weight of the amine increases above a certain level. In the formula $RNH_2$ for primary amine, the R is selected from aliphatic, cycloaliphatic and aromatic groups. In the case of primary aliphatic amines, the R is preferably paraffinic and preferably has a basic carbon chain length of no more than about 12 carbon atoms. If the basic chain has alkyl substituents or side chains, in most instances the basic chain length will be less than 8 carbon atoms. In the case of primary cycloaliphatic amines, the ring may have alkyl substituents which are generally of not more than about 3 carbon atoms each, with a total of usually not more than about 6 carbon atoms for such substituents. The same criterion usually applies to primary aromatic amines. However, selected multiple ring compounds can also be used, such as naphthyl amine.

In the formula RNHR' for secondary amines, the R and R' are generally as previously described for the R of the primary amines, and the secondary amines are generally subject to similar limitations of overall chain length and substituent groupings, with the same approximate total of carbon atoms for secondary amines as for the primary amines.

However, it will be noted that the present method involves the novel conversion of the adduct to the end product. Accordingly, any adduct of carbonyl sulfide and a nitrogen compound selected from the group consisting of ammonia, primary amine and secondary amine can be used in the present method. The foregoing criteria for the amines merely illustrate that as a practical matter usually only the indicated classes of primary and secondary amines readily form the adduct with carbonyl sulfide.

The ammonia or primary or secondary amine is contacted with the carbonyl sulfide while the ammonia or amine is in solution or in intimate non-reactive dispersion. Any suitable solvent or dispersant can be used, such as benzene, toluene or the like. The solvent or dispersant should be non-reactive with the COS and selected amine or ammonia so that the resulting adduct does not include the solvent or dispersant. In the case of ammonia or a primary amine, a solvent such as benzene, toluene, methanol, ethanol or the like can be employed. None of such solvents react with the COS and the ammonia or primary amine to form an adduct. However, in the case of the secondary amines, the solvent or dispersant should be carefully selected so as to be non-reactive therewith. Thus, isopropyl alcohol, tertiary butyl alcohol, benzene and toluene are suitable, as is furfural, etc. In general, most solvents are suitable. However, certain low molecular weight alcohols such as methanol and ethanol are not suitable, since an adduct-forming reaction occurs between the secondary amine, such alcohol and the COS with the undesirable result of having the alcohol incorporated into the adduct. Suitability of the solvent or dispersant for present purposes can be readily determined in accordance with the foregoing and further on the basis of simple testing.

The carbonyl sulfide is normally employed as the gas, in as pure form as is practical, and usually is merely bubbled through the selected amine or ammonia solution until the desired amounts of the carbonyl sulfide and the amine are present in the alcoholic solution. Other suitable ways of contacting the selected amine or ammonia with the carbonyl sulfide are also employed, for example, violent agitation of the selected amine or ammonia solution under a carbonyl sulfide blanket, autoclaving the selected amine or ammonia solution under carbonyl sulfide at increased pressure, etc.

The adduct-forming reaction can be characterized as follows:

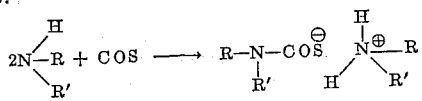

where R and R' are each alkyl, cycloalkyl or aromatic radicals or H.

In all instances, the reaction takes place while the selected amine or ammonia is in solution or at least in intimate dispersion in the solvent or dispersant and at any suitable temperature low enough to prevent decomposition of the adduct i.e. not more than about 25° C. in the case of ammonia-containing adducts and primary amine-containing adducts and not more than about 60° C. in the case of the secondary amine-containing adducts. As previously indicated, the carbonyl sulfide is bubbled through the solution or dispersion or is otherwise contacted therewith until a suitable concentration of carbonyl sulfide is present in solution and reacts with the amine or ammonia to form the adduct.

In the case of ammonia, the adduct-forming reaction is characterized as follows:

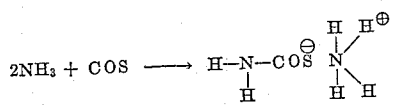

In the case of primary amines, the adduct-forming reaction is characterized as follows:

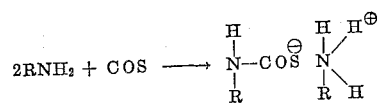

In case of secondary amines, the adduct-forming reaction is characterized as follows:

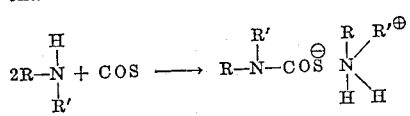

As previously indicated, the adduct-forming reaction itself does not form part of the present invention. Instead, in accordance with the present invention, the thus-formed adduct while still in solution or dispersion is converted to the desired urea or di- or tetra-substituted urea by a novel oxidation step, with resultant precipitation of sulfur from the COS as free sulfur, and with the accompanying formation of water as a by-product. Preferably, as hereinafter more particularly set forth, the novel oxidation reaction is carried out in the presence of an effective concentration of a material which improves the yield of desired product. Thus, for example, the oxidation reaction can be carried out under essentially anhydrous conditions, utilizing an initially essentially anhydrous solution or dispersion and removing water from the solution or dispersion as it is formed during the reaction. This can be accomplished by means of a suitable water adsorber. Alternatively, the oxidizing reaction can also be highly advantageously carried out to completion in an accelerated manner, with or without water adsorption, through the use of a selected oxidizing agent.

The water adsorber is insoluble in the adduct-containing solution or dispersion and essentially non-reactive under the oxidizing conditions of the present method with the adduct, the solvent or dispersant and ammonia or amine, as well as carbonyl sulfide and sulfur. For such purposes, selected anhydrous inorganic salts can be used, such as anhydrous calcium sulfate, anhydrous sodium sulfate and anhydrous zinc sulfate. Alternatively, other water adsorbers can be used, such as finely divided molecular sieve material (synthetic and natural zeolites), various clays, such as attapulgite clay, selected bentonites and the like known water adsorbers. For maximum effectiveness, such water adsorbers should be used in concentrations sufficient to adsorb substantially all of the water produced during oxidation of the adduct. Accordingly, for example, 100–250 gm. of water adsorber can be employed per mol of adduct immediately before oxidation is carried out, in order to increase the yield of desired product. Other concentrations of water adsorber are also suitable.

It has been found that selected salts can be employed in the adduct-containing solution or dispersion in order to accelerate the rate of oxidation of the adduct and also to increase the yield of product. Such salts are soluble, at least to some extent, in the adduct-containing solution or dispersion. The cations thereof generally readily undergo a change in valence e.g. from a higher oxidation state to a lower oxidation state during the oxidation. For such purposes, depending on the solubility of the particular salt in the particular solvent or dispersant bearing the adduct, halides, nitrates and sulfates of such valence-changing metals, such as iron, nickel, cobalt, copper, mercury, palladium, platinum and gold can be used, as well as those salts of other metals which act in a similar manner. As specific, non-limiting examples, where the usual alcohols are used as the solvents or dispersants, ferric chloride, nickelic chloride, cobaltic chloride, copper sulfate, cobaltic sulfate, cupric nitrate, cobaltic nitrate, and the like can be effectively used, depending on the particular alcohol. Usually, relatively small concentrations, for example, 1–5 percent (by weight of adduct), of the selected oxidizing agents are sufficient to provide the enhanced results. The optimum concentration of the particular oxidizing agent, of course, will vary, depending on such agent, the particular adduct, the particular solvent or dispersant, etc.

The basic oxidation reaction is effected with oxygen at a temperature sufficiently low to prevent heat decomposition of the adduct. For those adducts containing ammonia or primary amine, the temperature should not exceed about 25° C. For those adducts containing secondary amine, the temperature should not exceed about 60° C. It has been found that if a high temperature is used during the oxidation reaction, the yield of product may be materially impaired and unsatisfactory decomposition of the adduct may result. The oxidation can be accomplished, for example, by contacting the solution or dispersion under pressure with pure oxygen in a stirred autoclave at, for example, about 50° C. (in the case of secondary amine-containing adducts) and for a suitable period of time, for example, 2 to 4 hours. Alternatively, the solution or dispersion can be allowed to stand exposed to air under an oxygen blanket for a week or more at 20–30° C. or similar suitably low temperature.

Substantial heating above the limits indicated generally is to be avoided before the oxidation step is completed. However, thereafter, some additional heat can be employed for separation of product by distillation, etc., although low temperature vacuum distillation is preferred.

In the case of the ammonia-containing adduct, the oxidation reaction is characterized as follows:

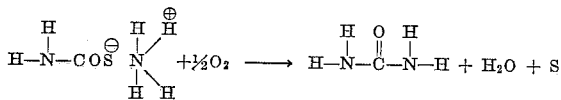

In the case of primary amine-containing adducts, the oxidation reaction is characterized as follows:

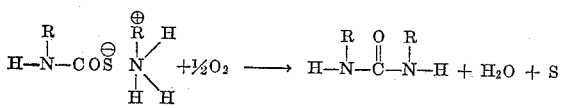

Thus, a di-substituted urea is produced, the R radicals on each side of the carbonyl group being the same.

In the case of the secondary amine-containing adduct, the oxidation reaction is characterized as follows:

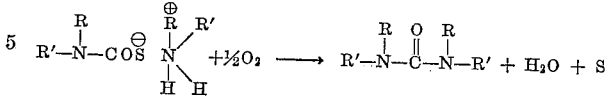

Thus, a tetra-substituted urea is provided, the R radicals on each side of the carbonyl group being the same. This is also true of the R' radicals.

The following examples further illustrate certain features of the present method.

EXAMPLE I

In a first experiment, methyl amine in 62 gm. amount and having the structural formula

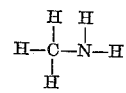

is dissolved in 300 cc. of absolute methyl alcohol at room temperature 25° C., after which essentially pure dry carbonyl sulfide gas is bubbled therethrough for about 30 minutes at 25° C. Approximately 60 gm. of carbonyl sulfide are added to the solution in this manner, after which the solution is placed in an autoclave and stirred while being subjected to an oxygen pressure of 50 p.s.i.g. for 4 hours at 21° C. The solution is then removed from the autoclave and filtered to remove precipitated sulfur, whereupon the solution is subjected to vacuum distillation to separately recover therefrom N,N' dimethyl urea

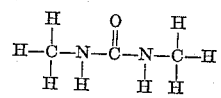

in a yield of about 90 percent of theoretical. The N,N' dimethyl urea is suitable for use in the synthesis of drugs. In a parallel run, anhydrous benzene is used as the solvent instead of methyl alcohol. The results are identical with those of the above-described run.

A second experiment is carried out which is identical with the above second run, except for the addition of 3 gm. of cupric sulfate ($CuSO_4$) into the solution immediately before the oxidizing step. The oxidization step is completed in 30 minutes, instead of 4 hours, and a yield of about 95 percent of theoretical of N,N'-dimethyl urea is obtained.

In a third substantially identical experiment, ethyl amine

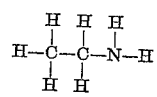

is substituted in 90 gm. amount for the methyl amine in 300 cc. of methyl alcohol, and 60 gm. of carbonyl sulfide are then added to the solution in the previously described manner. Upon oxidation, filtration and fractional distillation, as previously described, N,N' diethyl urea

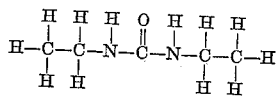

is obtained in a yield of about 90 percent of theoretical. The N,N' diethyl urea is suitable as an intermediate in the preparation of insecticides.

In a parallel run, when toluene is substituted for the methyl alcohol, identical results are obtained. In a subsequent run when cobalt nitrate is added in 2 gm. amount to the methyl alcohol solution immediately before oxidation, the oxidation is completed in 30 minutes, with a slightly greater yield (93%) of product.

EXAMPLE II

The procedure of the first experiment of Example I is carried out, except that 198 gm. of cyclohexylamine

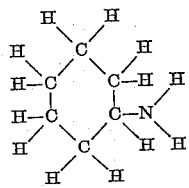

is reacted with carbonyl sulfide in a 60 gm. amount in 300 cc. of methyl alcohol at 25° C. to form a cyclohexylamine-carbonyl sulfide adduct. The resulting solution is then contacted with oxygen at 60 p.s.i.g. for 4 hours in a stirred autoclave at 20° C., after which the solution is filtered and vacuum distilled, so as to obtain an about 90 percent of theoretical yield of N,N' dicyclohexyl urea

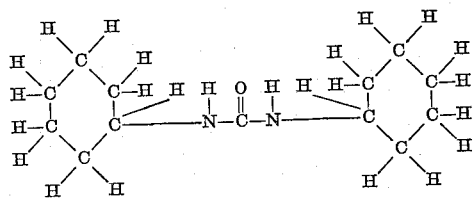

which is useful as an intermediate in the production of agricultural chemicals.

In a parallel run, heptane is substituted for the methyl alcohol, with identical results.

EXAMPLE III

The procedure of Examples I and II is carried out, except that aniline is used as the primary amine, and in an initial concentration of 186 gm., in 300 cc. of ethyl alcohol to form the adduct aniline-carbonyl sulfide upon bubbling of carbonyl sulfide gas therethrough for 15 minutes at 25° C. Thereafter, the solution is oxidized at 25° C. for 4 hours under 50 p.s.i.g. oxygen in a stirred autoclave to produce carbanilide

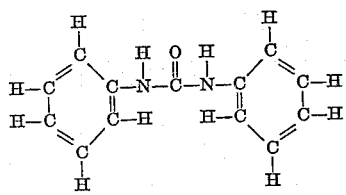

which is suitable for use in the synthesis of anhydrous agricultural chemicals and the like. Just before the oxidation step, sodium sulfate in 50 gm. amount is added to the solution as a water adsorber. Such addition helps to drive the reaction to completion and to increase the yield to about 90% of theoretical.

EXAMPLE IV

The procedure of Example II is carried out except that methyl cyclohexyl amine

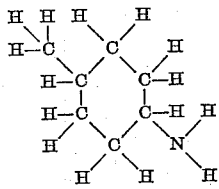

is used in place of cyclohexyl amine and in equivalent amount, and except that cyclohexanol

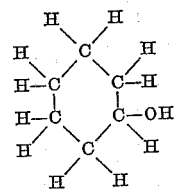

is used in place of methyl alcohol or heptane, and in a concentration of about 300 cc. Moreover, about 30 gm. of anhydrous calcium sulfate is added to the adduct-containing solution immediately before oxidation thereof. The oxidation step is carried out over a 3 hour period instead of a 4 hour period, and at 20° C. and 50 p.s.i.g. oxygen in a stirred autoclave.

The product is N,N' dimethyl cyclohexyl urea

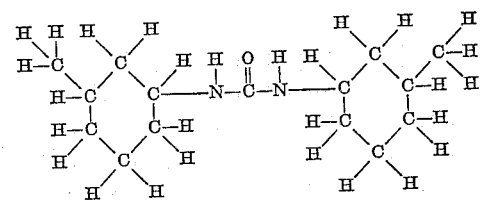

in a yield of about 90 percent of theoretical, which product is useful in the preparation of agricultural chemicals.

In the same manner as set forth in Examples I to IV, other di-substituted ureas can be prepared by the present method from primary amines and COS, utilizing the oxidation step of the present invention. For example, dipropyl urea can be prepared from propyl amine in methyl alcohol; urea can be prepared from ammonia in benzene; dimethyl cabanilide can be prepared from toluidine in methyl alcohol; and, dibenzyl urea can be prepared from benzyl amine in methyl alcohol.

The following Examples V and VI more particularly illustrate the preparation of urea by the present method.

EXAMPLE V

Ammonia gas in 34 gm. amount is dissolved in methanol (300 ml.) at room temperature and 60 gms. of carbonyl sulfide are dissolved therein at 25° C. over a 30 minute period, by bubbling carbonyl sulfide gas therethrough. The resulting solution is then oxidized at 50° C. and 50 p.s.i. oxygen pressure in a stirred autoclave for 2 hours to provide a 90% of theoretical yield of urea. The methanol is vacuum distilled from the product after filtering off the sulfur. An 80% yield of urea is obtained.

EXAMPLE VI

The procedure of Example V is carried out, but utilizing 17 gm. of ammonia in 150 ml. of benzene. The resulting solution has added thereto about 2 gm. of anhydrous cobalt chloride ($CoCl_2$) and is then oxidized at 25° C. and 50 p.s.i. for 30 minutes to obtain a 92% (of theoretical) yield of urea.

In a parallel run, the same procedure is carried out, except that 50 gm. of anhydrous zinc sulfate are also added to the solution before oxidation. The results are substantially identical. In both runs, the free sulfur is filtered off of the product and then the solvent is distilled off of the product.

Tetra-substituted ureas are prepared in a manner similar to that described for urea and the di-substituted ureas, as more particularly set forth in the following Examples VII, VIII and IX:

EXAMPLE VII

About 90 gm. of dimethyl amine having the formula

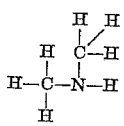

are dissolved in 300 ml. of benzene and the solution is contacted over a 15 minute period at 30° C. with carbonyl sulfide gas. About 60 gm. of carbonyl sulfide are adsorbed by the amine-benzene solution. The resulting solution contains the adduct

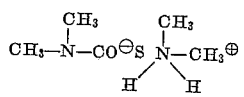

which adduct is then oxidized to tetra-methyl urea having the formula

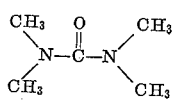

in a stirred autoclave at 50 p.s.i.g. at 30° C. for 3 hours. The product is filtered to remove free sulfur and is then fractionally distilled to recover about a 65% yield of tetra-methyl urea.

EXAMPLE VIII

N-methyl cyclohexyl amine which has the formula

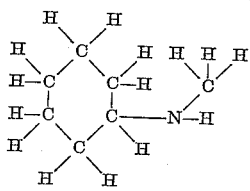

in 112 gm. amount is dissolved in 30 ml. of toluene, after which carbonyl sulfide gas is disposed as a blanket thereover and the solution is agitated in contact with said blanket at 25° C. until 30 gm. of carbonyl sulfide are dissolved therein. The resulting solution containing the adduct

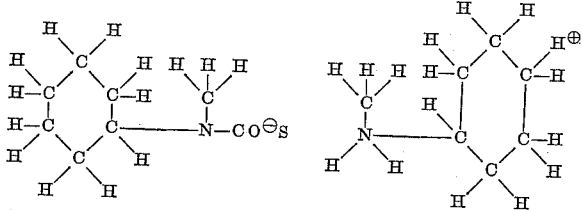

is oxidized at 50 p.s.i. oxygen pressure and 50° C. in a stirred autoclave for 3 hours to provide a yield of about 65% of theoretical of di-N-methyl cyclohexyl urea having the formula

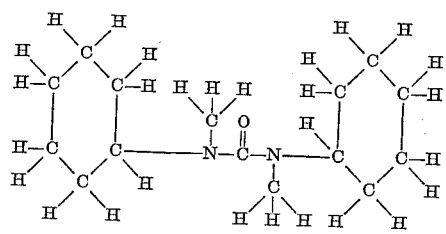

In a parallel run, 100 gm. of dry attapulgite clay are added to the adduct-containing solution before oxidation. The yield is increased to 90% of theoretical, utilizing the same oxidation time. In a third run, 2 gm. of anhydrous $CoCl_2$ are used in place of the attapulgite clay, with the same yield of product, and with a reduction of oxidation time to 30 minutes. In a fourth parallel run, both the 2 gm. amount of anhydrous $CoCl_2$ and the 100 gm. amount of attapulgite clay are used. Again, a yield of product which is about 90% of theoretical is obtained over an oxidation time of 30 minutes.

EXAMPLE IX

About 75 gm. of piperidine are dissolved in 300 ml. of toluene, after which 60 gm. of carbonyl sulfide gas at 30° C. are dissolved in the solution over a 1 hour period to form a COS-piperidine adduct. The solution is then oxidized at 60 p.s.i.g. oxygen pressure at 20° C. for 3 hours in a stirred autoclave to provide a 65% of theoretical yield of the substituted urea having the piperidyl configuration substituted on each side of the carbonyl radical. The desired product is separated from the solution by first filtering the solution free of precipitated sulfur, then fractionally vacuum distilling off the toluene. In parallel runs, the yield of product is increased to above 80% of theoretical by employing a water adsorber, such as anhydrous sodium sulfate, anhydrous calcium sulfate or the like, and/or an oxidizing agent or oxidation accelerator such as anhydrous cobalt chloride.

In like manner, other tetrasubstituted ureas can be prepared from diethyl amine, dipropylamine, dibutylamine, methyl ethyl amine, methyl propylamine and other secondary alkyl amines. Such ureas can also be prepared from pyrrolidine, azetidine, ethylene imine, dicyclohexylamine, n-ethyl cyclohexyl amine and other secondary amines.

It will be noted from the preceding examples that the yield of desired substituted urea and ureas can be substantially increased through the use of a selected material. Such material can, for example, be a water adsorber such as a non-reactive anhydrous inorganic salt, for example, anhydrous sodium sulfate or anhydrous calcium sulfate or a suitable mineral such as attapulgite clay, a bentonite, zeolite or the like. The water adsorber is used in a sufficient concentration to substantially adsorb the water formed as a by-product of the oxidation reaction and is insoluble in the solution or dispersion containing the adduct. Alternatively, a similar improvement in yield of product can be obtained by employing as the yield improver during the oxidation reaction a small catalyzing concentration of a selected oxidizing agent, the cation of which can readily undergo a change in valence during the oxidation step. Such agents are inorganic salts which are generally soluble in the solvent or dispersant in which the adduct is oxidized. Thus, a few grams of anhydrous cobalt chloride, $CoCl_2$, are sufficient to obtain the same improvement in yield as the larger amounts of water adsorber. Moreover, ferric chloride, cupric nitrate, cupric sulfate, nickelic chloride and other such salts are highly effective as the oxidizing agent. Such oxidizing agent has the further effect of substantially reducing the amount of time necessary for the oxidizing reaction to go to completion.

The preceding examples further illustrate that urea and di- and tetra-substituted ureas can be easily prepared by the present method from adducts consisting essentially of carbonyl sulfide and a nitrogen-containing reagent selected from the group consisting of primary amine, secondary amine and ammonia. The present method involves the oxidation of the adduct in an inert liquid medium consisting of a solution or dispersion and at low temperature and in a controlled manner to the desired urea or di- or tetra-substituted urea, with the accompanying production of precipitated free sulfur and water. The desired product can be readily separated from reactants and by-products, as by filtration, vacuum distillation, etc. The method offers improved control of the synthesis of urea and di- and tetra-substituted ureas in high yield in a simple, economical manner. The products of the method are useful in the preparation of a variety of medical, pharmaceutical, agricultural and industrial chemicals. Other advantages of the present invention are as set forth in the foregoing.

Various modifications, alterations, substitutions and additions can be made in the present method, and in the steps, conditions and materials for carrying out the method. All such modifications, alterations, substitutions and additions which are within the scope of the appended claims form a part of the present invention.

What is claimed is:

1. An improved method of preparing ureas comprising treating an adduct consisting of carbonyl sulfide and a nitrogen compound selected from the group consisting of ammonia, a primary amine and a secondary amine, said adduct having a molecular ratio of carbonyl sulfide to nitrogen compound of 1:2, in an inert liquid medium with molecular oxygen and from about 1–5% by weight of said adduct of an inorganic salt of a metal which readily undergoes a change in valence at a temperature below the heat decomposition temperature of said adduct, said temperature being not more than about 60° C.

2. The method of claim 1 wherein the metal is cobalt or copper.

3. The method of claim 1 wherein the nitrogen compound is ammonia and the temperature is not in excess of about 25° C.

4. The method of claim 1 wherein the nitrogen compound is a primary amine and the temperature is not in excess of about 25° C.

5. The method of claim 1 wherein the nitrogen compound is a secondary amine and the temperature is not in excess of about 60° C.

6. The method of claim 1 wherein said urea is recovered from said medium by filtering off precipitated free sulfur, and by fractional distillation.

7. The method of claim 1 wherein a water adsorber insoluble in the medium is present therein during said treatment, which water adsorber effects an increase in yield of said urea.

8. The method of claim 7 wherein said water adsorber comprises anhydrous calcium sulfate.

9. The method of claim 7 wherein said water adsorber comprises anhydrous sodium sulfate.

10. The method of claim 1 wherein said medium is a solvent for said nitrogen compound, carbonyl sulfide and adduct and wherein said treatment is effected in a stirred autoclave under an oxygen pressure of about 60 p.s.i.g. for about 3–4 hours.

11. The method of claim 4 wherein said primary amine comprises methyl amine, wherein said medium comprises anhydrous methyl alcohol, wherein said adduct is dissolved in said alcohol and is oxidized therein while in an autoclave at about 50 p.s.i.g. oxygen pressure for about 4 hours at about 21° C., and wherein said solution is filtered free of precipitated sulfur and thereafter vacuum distilled to recover dimethyl urea.

12. The method of claim 3 wherein said medium is methanol, wherein said adduct is dissolved in said methanol and is oxidized therein while in a stirred autoclave at about 25° C. and about 50 p.s.i.g. oxygen pressure for about 2 hours and wherein precipitated free sulfur is filtered from said solution and said methanol is then vacuum distilled from said urea.

13. The method of claim 5 wherein said secondary amine is dimethyl amine, wherein said medium is benzene, wherein said adduct is dissolved in said benzene and is oxidized therein while in a stirred autoclave at about 50 p.s.i.g. and about 30° C. for about 3 hours, and wherein precipitated free sulfur is filtered from said solution and said benzene is vacuum distilled from the product, tetramethyl urea.

References Cited

Baiocchi et al., J. Org. Chem., vol. 21 (1956), pp. 1546–47.

HENRY R. JILES, *Primary Examiner.*